Dec. 29, 1964   S. J. ANTALIS ETAL   3,163,838
INDUCTIVE DEVICE EMPLOYING FOAMED RESIN THERMAL BARRIER
Filed March 28, 1962

FOAMED RESIN

INVENTORS:
Don C. Wood,
Stanley J. Antalis,
by Henry J. Marciniak
Attorney.

United States Patent Office 3,163,838
Patented Dec. 29, 1964

3,163,838
INDUCTIVE DEVICE EMPLOYING FOAMED
RESIN THERMAL BARRIER
Stanley J. Antalis and Don C. Wood, Fort Wayne, Ind.,
assignors to General Electric Company, a corporation
of New York
Filed Mar. 28, 1962, Ser. No. 183,188
7 Claims. (Cl. 336—55)

This invention relates to inductive devices and more particularly to inductive devices such as transformers having an improved terminal lead arrangement.

The transfer of electrical energy by electromagnetic induction in devices such as reactors and transformers is generally accompanied by the evolution of heat. To prevent this heat from damaging the device it is desirable, if not necessary, to provide suitable heat transfer paths so that the heat can be dissipated to the ambient environment. For example, in a small power transformer the heat emitted from the core and coil assembly is generally dissipated through an encapsulating compound or other medium in contact with the core and coil assembly, to the transformer case or enclosure and then to the surrounding atmosphere. Where the conductors of the transformer coil are brought out to terminals in a junction box or wiring compartment, some of the heat emitted from the core and coil assembly is transferred to the terminals and to the junction box or wiring compartment of the transformers. Consequently, the external leads connected to the terminals within the wiring compartment are subjected to heat emitted from the core and coil assembly.

In many instances such prior art terminal lead arrangements have presented difficulties. Frequently, the insulation of the external leads used to make connections to the transformers has a temperature rating of 60 degrees centigrade. When a power transformer is operated near its rated output, the terminals to which such external leads are joined and the interior surface of the transformer touching the leads may reach a temperature in excess of 60 degrees centigrade. Thus, insulation near the terminals and the insulation coming in contact with the interior surface of the wiring compartment may be heated above its rated temperature. Such overheating may cause deterioration of the insulation of the external leads and create a hazard to personnel and equipment. It is desirable therefore that a terminal lead arrangement be provided whereby external leads having insulation rated at relatively low temperatures as discussed above, may be employed to make connections to an inductive device such as a transformer without exceeding the insulation temperature rating of the external leads.

It is therefore desirable to provide a terminal lead arrangement which will permit external leads having a low temperature insulation rating, such as for example, a temperature rating of 60 degrees centigrade, to be used to make connections to the transformer without overheating these external leads. Further, it is desirable that such an arrangement be simple in its construction and economically manufactured.

Accordingly, it is an object of this invention to provide an inductive device such as a transformer having an improved terminal lead arrangement for connecting the transformer in an electrical circuit.

A more specific object of the invention is to provide a transformer wherein the heat emitted from the core and coil assembly of the transformer is prevented from overheating the insulation of external leads connected in circuit with the conductors brought out from a coil.

It is another object of the invention to provide an improved terminal lead arrangement for inductive devices such as transformers wherein insulation having a lesser temperature rating than the insulation of the coil conductors can be used for the external leads connected in circuit therewith.

In accordance with one form of our invention, we have provided an improved inductive device such as a transformer, including an improved terminal lead arrangement. In this device, at least one electrical coil is disposed on the magnetic core, and a plurality of electrical conductors are brought out from the coil to a wiring compartment which forms a part of a sleeve member or case. The sleeve member provides an enclosure for a portion of the coil and magnetic core. A thermally insulating wall formed of a foamed resin is disposed within the sleeve member to provide a thermal barrier between the wiring compartment and the electrical coil. The electrical conductors, preferably insulated, are brought out from the coil through the thermally insulating wall for making electrical connections with the external leads in the wiring compartment. Such a terminal lead arrangement was found to effectively minimize the amount of heat transferred from the device to the external leads through the electrical connections and through contacts with the interior walls of the wiring compartment.

The subject matter which we regard as our invention is set forth in the appended claims. The invention itself, however, together with further objects and advantages thereof may be better understood by referring to the following description taken in connection with the accompanying drawings in which:

Figure 1:
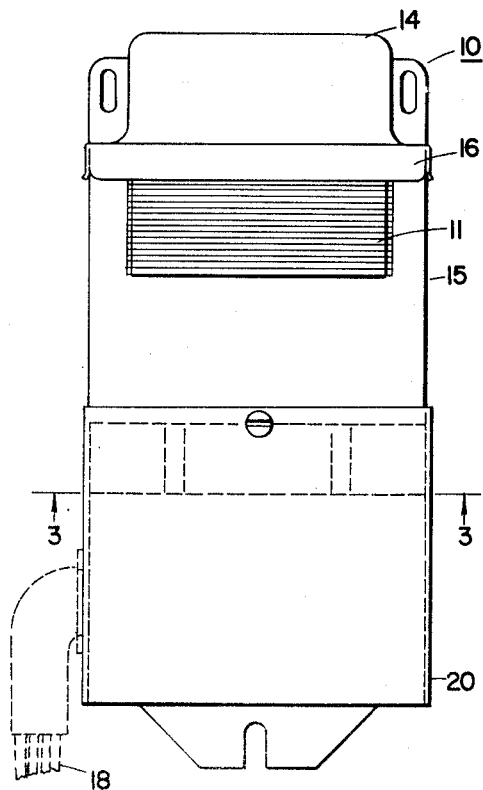
FIGURE 1 is a front elevational view of an inductive device, such as a transformer, incorporating one form of our invention.

Referring now to the figures of the drawings, the improved inductive device and terminal lead arrangement is shown embodied in a power transformer 10 of the compound-filled type. A magnetic core 11 of the transformer 10 is conventionally formed of a stack of a plurality of relatively thin laminations of suitable magnetic material. As will be seen in view shown in FIGURE 2, an electrical coil 12 is disposed on a center winding leg 13 of the magnetic core 11 and includes a primary and secondary winding of the transformer 10.

The laminations of the magnetic core 13 are held in assembled relation by an end cap 14 and a sleeve member 15, the end cap 14 being provided with a substantially rectangular flanged portion 16 attached to the sleeve member 15. The end cap 14 provides a protective covering for one exposed portion of the electrical coil 12 which extends out of the magnetic core 11. The other exposed portion of the coil 12 is enclosed by the sleeve member 15 which is substantially rectangular in configuration.

Figure 3:
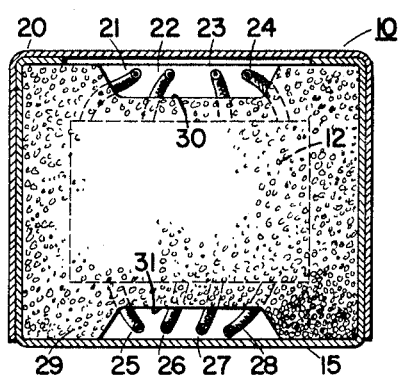
FIGURE 3 is a sectional view of the inductive device shown in FIGURE 1 taken along line 3—3 of FIGURE 1.

As is best seen in the views shown in FIGURES 1 and 3, the lower part of the sleeve member 15 forms a junction box or wiring compartment 17 where the external leads 18 shown in dashed outline are connected in circuit with the electrical coil 12. Suitable knock-outs 19 are provided for conduit connections and the like. To provide access to the wiring compartment 17, a coverplate 20 is attached to the sleeve member 15 by means of a sheet metal lag screw as shown in FIGURE 1.

Referring now more specifically to the sectional view shown in FIGURE 3, a plurality of insulated electrical conductors 21, 22, 23, 24, 25, 26, 27 and 28 extend through a thermally insulating wall 29. The insulating wall 29 is formed with a pair of oppositely disposed recessed portions 30, 31 to provide an opening through which the electrical conductors 21, 22, 23, 24, 25, 26, 27 and 28 respectively are brought out to the wiring compartment 17. In such an arrangement, the need for a terminal board is eliminated, the external leads 18 being directly connected to the insulated electrical conductors brought out from the coil 12.

We have found that by bringing out the electrical conductors from the coil 12 through the thermally insulating wall 29, the amount of heat transferred to the external leads 18 by means of the electrical conductors 21, 22, 23, 24, 25, 26, 27 and 28 could be effectively minimized. Further, it was found that where the external leads 18 are connected in accordance with the terminal lead arrangement of the invention, the temperature of the interior surface of the wiring compartment 17 and thereby the temperature of the insulation coming in contact with the interior surfaces of the wiring compartment 17 can be maintained below predetermined temperature levels. For example, in the illustrated embodiment of the invention it was possible to keep the temperature of the interior surface of the wiring compartment below 60 degrees centigrade when the transformer 10 was operated at its rated output. Accordingly, external leads 18 with insulation rated at 60 degrees centigrade could be used to make electrical connections to the transformer 10.

Although in the exemplification of the invention the space between the coil 12, the sleeve member 15 and insulating wall 29 was filled with a potting compound 32, it will be appreciated that the terminal lead arrangement of the invention may be utilized in air cooled transformers. Encasing the exposed portions of the coil 12 with a suitable potting compound will facilitate transfer of heat emitted in the coil 12 and magnetic core 11 to the sleeve member 15 and end cap 14 where the heat is dissipated to the ambient environment. Where an inductive device such as the power transformer 10 is air cooled, it will be apparent that more space must be provided between the sleeve member 15 and the coil 12 to allow for air circulation.

In the illustrated embodiment of the invention, the thermally insulating wall 29 of foamed resin was secured to the sleeve member 15 by means of a suitable adhesive. It will, however, be appreciated that the thermally insulating wall 29 may be pressed into the sleeve member 15 or poured in place.

Suitable materials which may be used in the practice of our invention are those formed by foaming polyurethane, silicone, epoxy, phenolic, polycarbonate or polystyrene resins or combinations thereof. In the transformer 10 used to exemplify the invention a foamed polyurethane resin containing 14½ percent by weight of antimony trioxide was employed.

The foamed polyurethane resin used in the practice of our invention is obtained by the reaction of water or a carboxy compound on the reaction product of a diisocyanate and a suitable polyester which contains carboxy and hydroxy groupings. The resulting evolution of carbon dioxide produces the cellular or foamed structure. Suitable polyesters, which may be used, are those derived from dimerized linoleic acid condensed with a glycol or a polyoxyalkylene glycol, such as polypropylene glycol. The condensation product of adipic acid and a molar excess of diethylene glycol, together with a small proportion of a dihydric polyol, is also a suitable polyester.

Figure 2:
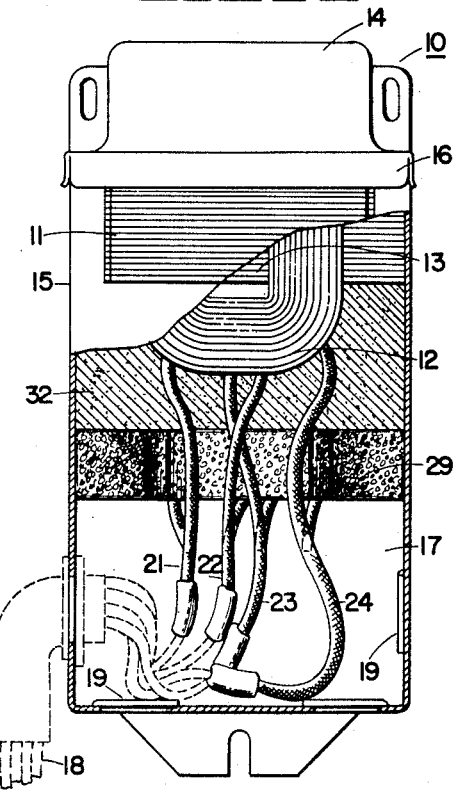
FIGURE 2 is a front elevational view of the inductive device as shown in FIGURE 1 wherein the portion of the case is cut away to show the terminal lead arrangement.
Figure 4:
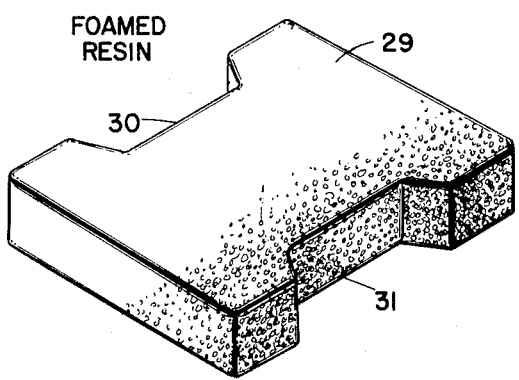
FIGURE 4 is a perspective view of the thermally insulating wall of foamed resin employed in the illustrated embodiment of the invention.

In order to graphically illustrate the improved results which may be obtained in accordance with the invention, temperature measurements as summarized in Table I were made on a pair of transformers having a rating of .250 and .500 kva. This pair of transformers were operated at their rated output and employed the terminal lead arrangement as shown in FIGURE 2. By way of comparison, temperature measurements were made of a similar pair of transformers which did not employ the improved terminal lead arrangement. In the transformer rated at .250 kva. a foamed polyurethane resin insulating wall 29 having a thickness of .58 inch, a length of 3.56 inches and a width of 2.90 inches was used as an insulating barrier. In the .500 kva. transformer an insulating wall 29 of foamed polyurethane resin was also used and it had a thickness of .84 inch, a width of 4.30 inches and a length of 3.52 inches.

*Table I*

|  | Transformer Employing Terminal Lead Arrangement Shown in Figure 2 | | Conventional Compound Filled Transformer Without Terminal Lead Arrangement | |
| --- | --- | --- | --- | --- |
|  | .250 kva. | .500 kva. | .250 kva. | .500 kva. |
| Air Temperature in Wiring Compartment (° Centigrade) | 50.5 | 54 | 52 | 61.5 |
| Temperature of Insulating Wall Surface (° Centigrade) | 53 | 54 | -------- | -------- |
| Temperature of Compound Adjacent to Wiring Compartment (° Centigrade) | -------- | -------- | 64 | 74 |
| Ambient Temperature (° Centigrade) | 27 | 27 | 27 | 30.5 |

From temperatures set forth in Table I, it will be seen that an external lead touching the insulating wall 29 will not be subjected to a temperature above 60 degrees centigrade and that the temperature within the wiring compartment is below 60 degrees centigrade. In identical transformers without the terminal lead arrangement of the invention, it will be apparent from Table I that an external lead contacting the surface of the potting compound would be subjected to a temperature in excess of 60 degrees centigrade (64 degress centigrade for the .250 kva. transformer and 74 degrees for the .500 kva. transformer). Thus, the external leads to such conventional transformers must have an insulation rating above 60 degrees centigrade to prevent deterioration of the insulation resulting from overheating.

In the terminal lead arrangement of the invention the conductors 21, 22, 23 and 24 brought out from the coil 12, as seen in FIGURE 2, extend through the thermally insulating wall 29 and into the wiring compartment 17. A sufficient length of the conductors 21, 22, 23 and 24 is provided to insure that the temperature at the terminal ends of these conductors will not cause the insulation to be heated in excess of its temperature rating. The thermally insulating wall 29 serves as a wall within the sleeve 15 adjacent to the lower portion of the potting compound 32 surrounding coil 12. As heat is emitted from the coil 12, it is dissipated to the surrounding environment by the side formed by end cap 14, the four sides of the sleeve member 15 and the exposed portions of the magnetic core 11. However, the thermally insulating wall 29 serves as a thermal barrier to prevent undue amounts of the heat from being transferred to the wiring compartment and the external leads 18 connected in circuit with the coil 12. We have found that a heat transfer surface in place of the thermally insulating wall 29 was not required and that this wall used as a thermal barrier could be employed to achieve important advantages.

From the foregoing description of the terminal lead arrangement of the invention, it will be apparent that an improved arrangement is provided for connecting external leads to an electrical coil or coils of inductive devices such as transformers wherein the heat transferred to such external leads is effectively minimized. This results in the important advantage that generally available leads having a temperature rating of 60 degrees centigrade can be used to make connections to the device and eliminates the hazard to personnel and equipment that is created when such leads are inadvertently connected to an inductive device that subjects the lead to temperatures in excess of the rated insulation temperature.

While we have illustrated and described one particular embodiment of an invention, it will be appreciated that many modifications may be made as will be apparent to those skilled in the art. It is to be understood therefore that this invention is not intended to be limited to this particular embodiment and that it is intended by the appended claims to cover all modifications that come within the spirit and scope of the invention.

What we claim as new and desire to secure by Letters Patent of the United States is:

1. An inductive device comprised of a magnetic core, at least one electrical coil disposed on said magnetic core and having a plurality of electrical conductors brought from said coil, a thermally conductive sleeve means encasing at least a part of said magnetic core and coil, said sleeve means also forming a wiring compartment for housing the ends of said electrical conductors brought out from said coil, and a thermally insulating wall disposed within said sleeve means between said wiring compartment and said core and coil and providing a thermal barrier therebetween to prevent the temperature of said wiring compartment from exceeding 60 degrees centigrade, said thermally insulating wall being formed of foamed resin and said electrical conductors extending through said thermally insulating wall and being adapted for connection to the external leads within said compartment.

2. The inductive device as set forth in claim 1 wherein said thermally insulating wall is formed of foamed polyurethane resin.

3. A transformer comprising a magnetic core, at least one electrical coil disposed on said core and including a primary and a secondary winding inductively coupled on said core, said electrical coil having a plurality of electrical conductors brought out therefrom for connection to external leads, a sleeve means encasing at least a portion of said electrical coil and said magnetic core, a wiring compartment formed within said sleeve means and housing the ends of said electrical conductors brought out from said coil, and a thermally insulating wall disposed within said sleeve means between said wiring compartment and said core and coil to form a thermal barrier therebetween to prevent the temperature of said wiring compartment from exceeding 60 degrees centigrade, said thermally insulating wall being formed of foamed resin and said electrical conductors extending through said thermally insulating wall and being adapted for connection to the external leads.

4. The transformer as set forth in claim 3 wherein the thermally insulating wall is formed of foamed polyurethane resin.

5. A transformer comprising a magnetic core formed of a plurality of stacked laminations and having at least one coil thereon, said electrical coil having a plurality of insulated electrical conductors, a thermally conductive sleeve member partially encasing said magnetic core and a first portion of said coil, a wiring compartment extending within said sleeve member for housing the ends of external leads connected in circuit with said insulated electrical conductors, an end cap joined to said sleeve member and providing an enclosure for a second portion of electrical coil, a thermally insulating wall disposed between said electrical coil and said wiring compartment to form a thermal barrier therebetween, and a thermally conductive dielectric compound disposed within said end cap and within said sleeve means between said thermally insulating wall and said end cap, said thermally insulating wall being formed of foamed resin and said insulated electrical conductors extending through said thermally insulating wall for connection to external leads in said wiring compartment.

6. A transformer comprising a magnetic core, at least one electrical coil disposed on said magnetic core and including a primary and a secondary winding inductively coupled on said core, said electrical coil having a plurality of insulated electrical conductors extending therefrom, a substantially rectangular shaped sleeve means encasing a portion of said electrical coil and said magnetic core, an end cap assembled with said sleeve means, a substantially rectangular shaped thermally insulating wall disposed within said sleeve means, a wiring compartment formed within said sleeve means and housing the ends of electrical connectors brought out from said coil for connection in circuit with external leads, said sleeve means, end cap and said wiring compartment providing an enclosure for a portion of said coil and core, said thermally insulating wall interposing a thermal barrier between said wiring compartment and said magnetic core and electric coil, said thermally insulating wall being formed of foamed resin, and said insulated electrical conductors extending through said thermally insulating wall and being adapted for connection to external leads within said winding compartment.

7. The transformer as set forth in claim 6 wherein said thermally insulating wall is formed with a pair of oppositely disposed recessed portions to provide an opening between the sides of said sleeve member and said thermally insulating wall for the insulated electrical conductors.

References Cited by the Examiner

UNITED STATES PATENTS

| | | | |
|---|---|---|---|
| 366,544 | 7/87 | Westinghouse | 336—96 X |
| 2,532,243 | 11/50 | Ott | 252—62 X |
| 3,030,597 | 4/62 | Piaia et al. | 336—96 X |

JOHN F. BURNS, *Primary Examiner.*

UNITED STATES PATENT OFFICE
CERTIFICATE OF CORRECTION

Patent No. 3,163,838  
December 29, 1964

Stanley J. Antalis et al.

It is hereby certified that error appears in the above numbered patent requiring correction and that the said Letters Patent should read as corrected below.

Column 6, line 45, for "member" read -- means --.

Signed and sealed this 24th day of August 1965.

(SEAL)  
Attest:

ERNEST W. SWIDER  
Attesting Officer

EDWARD J. BRENNER  
Commissioner of Patents